Patented Oct. 15, 1929

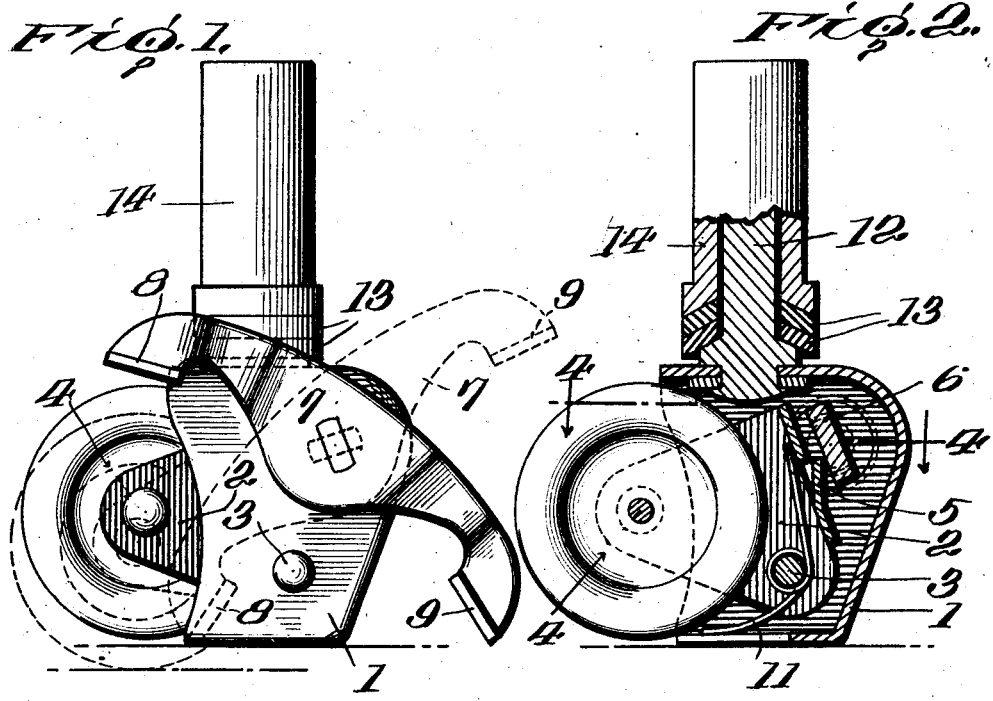
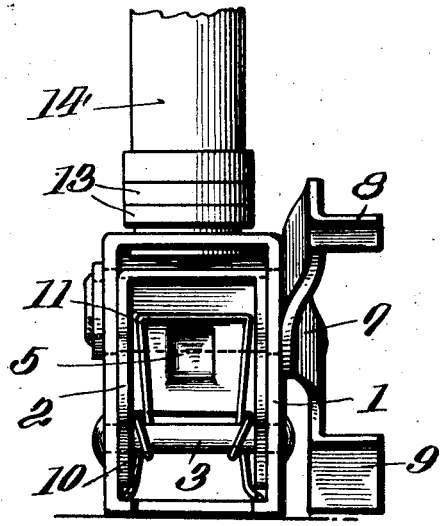
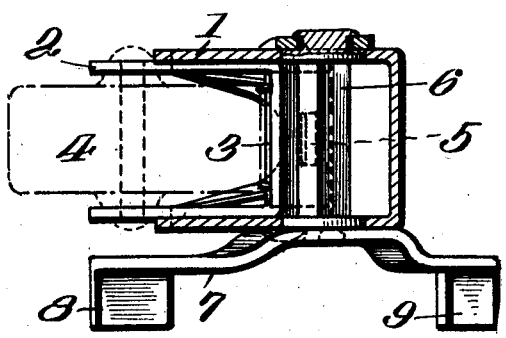

1,731,640

UNITED STATES PATENT OFFICE

TRUMAN THURLBY, OF DETROIT, AND ARTHUR LE ROY TURRILL, OF FORDSON, MICHIGAN

CASTER

Application filed June 8, 1927. Serial No. 197,351.

This invention relates to casters for furniture and the object of our invention is to provide a caster having an adjustable roller which may be expeditiously moved from its upper or inoperative position to its lower or operative position.

Another object of our invention is to provide a caster in which the roller may be held securely in its operative position.

Another object of our invention is to provide a caster in which, when the roller is in its inoperative position, the rigid caster frame rests on the floor.

We accomplish the above and other objects of the invention, which will be apparent as the description proceeds, by means of the device shown in the accompanying drawings in which Figure 1 is a side elevation of our improved caster, the lower or operative position of the roller and its operating lever being shown in dotted lines;

Figure 2 is a vertical section of the caster;

Figure 3 is a front elevation of the caster with the wheel removed; and

Figure 4 is a section on the line 4—4 of Figure 2.

On the drawings, in which like reference characters indicate like parts on the figures thereof, 1 indicates the hollow box caster frame in which is mounted the wheel support 2 by means of a pivot 3 passing through the forks of the support and the frame. The caster wheel is indicated at 4.

The wheel support 2, which is U-shaped in cross section, fits within the caster frame. The rear wall of the support is formed with a struck out portion or projection 5 which serves as a stop and latch to secure the support and the wheel in their lowered operative position, as will hereinafter more fully appear.

A cam 6 is rotatably mounted on the interior of the caster frame behind the wheel support and above the pivot thereof and in such relation thereto as to bear against the rear face thereof to move the wheel support on its pivot.

The operating member for the cam 6 comprises a lever 7 secured to the cam pivot on the exterior of the frame. The lever is provided with foot rests 8, 9, respectively, whereby it may be operated to move the cam and the wheel support to either of two positions.

Surrounding the pivot of the wheel support is a spring 10 having a portion 11 bearing against the rear wall of the fork which serves to maintain it in engagement with the cam.

A stem 12 extends upwardly from the caster frame and is riveted thereto. The stem 12 is designed to enter the recess of the leg of the article which it is designed to support, conical washers 13 being located between the frame and the leg. Preferably a socket 14 for the stem 12 is located in a recess in the article leg, the socket being formed with a chamfered lower edge and the stem with a conical base; the conical washers are thus held between the conical base of the stem and the chamfered edge of the socket and side play between the parts is eliminated.

When it is desired to raise the wheel from the floor so that the lower flat wall of the caster frame will rest directly on the floor, the lever 7 is turned by pressing on the foot rest 9, whereupon the flat base of the cam 6 will be presented to the rear wall of the wheel support and the spring 10 will operate to turn the support on its pivot, thereby raising the support and the wheel as shown in full lines in Fig. 2.

When it is desired to lower the wheel and its support, pressure is applied to the foot rest 8, thereby turning the cam so that the edge thereof will bear against the rear face of the wheel support and force it to its lowered position until the wheel rests on the floor. The struck out portion 5 forms a stop and latch for the cam, as will be apparent from an inspection of Fig. 2.

It will thus be seen that not only does the caster device provide a strong and rigid construction but that when the wheel is raised, the leg rests on the caster frame and the caster frame rests on the floor thereby making a solid support for the leg. Likewise, when the wheel is in its lowered position, it is rigidly held from turning by the engagement of the cam against the struck out portion of the wheel support.

Having thus described our invention, what we claim as new and desire to secure by Letters Patent is:—

1. In a caster, a hollow frame including two spaced vertical walls and a horizontal floor engaging wall, a wheel support pivoted between said vertical walls, a combined latch and stop on said support, means for moving the support on its pivot, said means engaging said latch and stop to hold the support in one position.

2. In a caster, a hollow frame including two spaced vertical walls and a horizontal floor engaging wall, a forked wheel support pivoted between said vertical walls, a combined latch and stop on said support, means for moving the support on its pivot, said means comprising a cam adapted to engage said latch and stop to hold the support in one position.

3. In a caster, a hollow frame including two spaced vertical walls and a horizontal floor engaging wall, a wheel support having spaced vertical walls pivoted in the vertical walls of the frame, a combined latch and stop on said support, a spring for holding the support in one position, means for moving the support on its pivot against the action of the spring, said means engaging said latch and stop for holding said support in another position.

4. In a caster, a frame, a wheel support pivoted thereto, means for moving the support on its pivot, and a spring for holding the support in engagement with said means.

5. In a caster, a frame, a wheel support pivoted thereto, a cam for moving the support on its pivot, operating means for said cam, and a spring for holding the support in engagement with said cam.

6. A detachable caster for a furniture leg comprising a frame having a floor engaging means, a stem on said frame adapted to enter a socket in the leg, a wheel, a wheel support pivoted to said frame and means on said frame for moving the wheel support and its wheel on its pivot from an inoperative position to an operative position, said wheel support and said wheel being out of alignment with the axis of the stem, and means for preventing side motion of the stem relatively to its socket when the wheel and wheel support are in operative position.

In testimony whereof we have hereunto signed our names.

TRUMAN THURLBY.
ARTHUR LE ROY TURRILL.